United States Patent
Joshi et al.

(10) Patent No.: US 7,295,857 B2
(45) Date of Patent: Nov. 13, 2007

(54) METHOD AND APPARATUS FOR PERFORMING ACQUISITION IN POWER SAVE MODE FOR WIRELESS COMMUNICATION SYSTEMS

(75) Inventors: Abhay A. Joshi, San Diego, CA (US); James A. Hutchison, San Diego, CA (US); Peter J. Black, San Diego, CA (US); Simon Turner, San Diego, CA (US); Thunyachate Ekvetchavit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 10/447,630

(22) Filed: May 28, 2003

(65) Prior Publication Data

US 2004/0087309 A1 May 6, 2004

Related U.S. Application Data

(60) Provisional application No. 60/422,656, filed on Oct. 30, 2002.

(51) Int. Cl.
*H04M 1/00* (2006.01)
(52) U.S. Cl. .............................. 455/550.1; 455/432.1; 455/552.1; 370/352; 370/329
(58) Field of Classification Search ............ 455/552.1, 455/432.1, 433, 513, 67.1, 404.1, 550.1, 455/435.1; 370/352, 401, 331, 335, 329
See application file for complete search history.

(56) References Cited

U.S. PATENT DOCUMENTS 5,517,677 A  5/1996  Moon ..................... 455/161.1

(Continued)

FOREIGN PATENT DOCUMENTS

EP        1467500 A      10/2004

(Continued)

OTHER PUBLICATIONS

Jim Tomcik: "OFDD Technology Overview Presentation" [Online] Nov. 15, 2005, pp. 1-73, XP002422346, Internet URL: http//ieee802.org/20/contribs/C802.20-05-59rl.pdf, pp. 6, 26, 20-41, 47.

*Primary Examiner*—Danh Le
(74) *Attorney, Agent, or Firm*—Thomas Rouse; Howard Seo; Peng Zhu

(57) ABSTRACT

Techniques to efficiently attempt acquisition of a packet data system (e.g., an IS-856 system). If a terminal has acquired one or more channels in a voice/data system (e.g., an IS-2000 system), then it can attempt acquisition on channels in the packet data system that are co-located with the acquired channels in the voice/data system. Multiple acquisition modes may be used, and on-going acquisition attempts on the co-located channels may be performed using one acquisition mode at a time in order to reduce power consumption. Acquisition attempts may be performed in a "ping-pong" manner to improve the likelihood of acquisition. For a ping-pong search, an acquisition attempt is made on the most recently acquired channel prior to an acquisition attempt on each of the remaining channels. Received signal strength estimates may also be obtained for selected channels and may be used to determine whether or not to attempt acquisition on these channels.

20 Claims, 7 Drawing Sheets

U.S. PATENT DOCUMENTS

| | | | | |
|---|---|---|---|---|
| 5,657,317 | A | * | 8/1997 | Mahany et al. ............. 370/338 |
| 5,696,903 | A | * | 12/1997 | Mahany ....................... 709/228 |
| 5,781,543 | A | | 7/1998 | Ault et al. .................. 370/342 |
| 5,805,648 | A | | 9/1998 | Sutton ........................ 375/367 |
| 5,924,038 | A | | 7/1999 | Uistola ....................... 455/450 |
| 6,064,890 | A | * | 5/2000 | Hirose et al. ............... 455/513 |
| 6,091,362 | A | * | 7/2000 | Stilp et al. .................. 342/465 |
| 6,343,070 | B1 | | 1/2002 | Klas et al. .................. 370/329 |
| 6,801,762 | B1 | * | 10/2004 | Huilgol .................... 455/404.1 |
| 2002/0159416 | A1 | * | 10/2002 | Kazmi et al. ............... 370/335 |
| 2003/0031143 | A1 | * | 2/2003 | Faerber ....................... 370/331 |
| 2005/0013266 | A1 | * | 1/2005 | Kubler et al. ............... 370/328 |

FOREIGN PATENT DOCUMENTS

| | | |
|---|---|---|
| WO | 0176088 | 10/2001 |
| WO | WO02052757 A | 7/2002 |

* cited by examiner

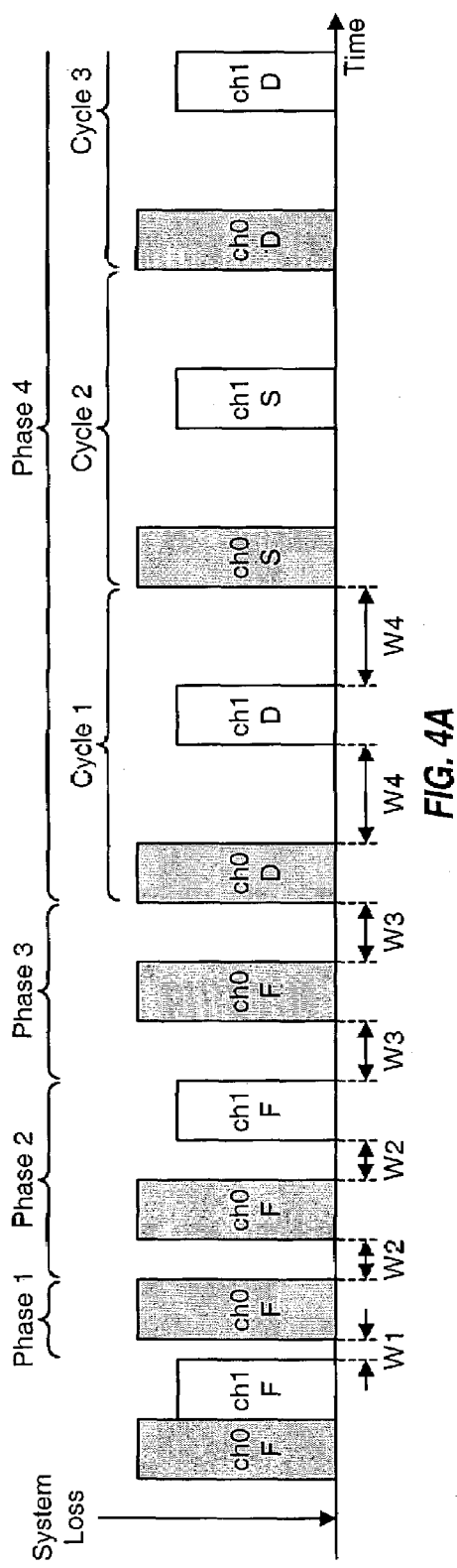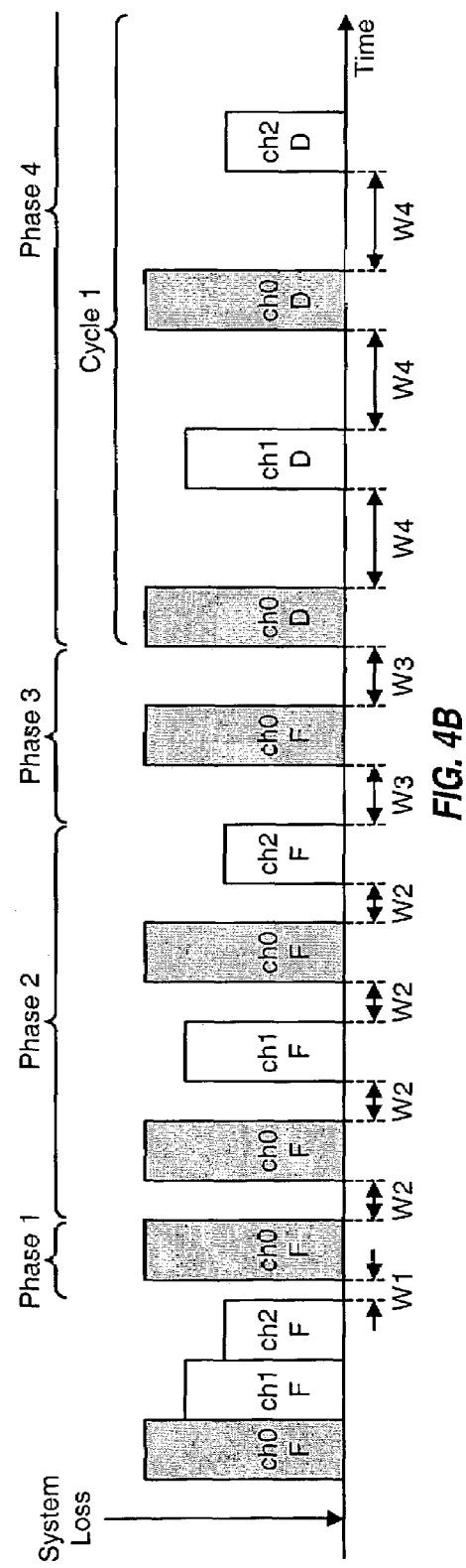
FIG. 4A
FIG. 4B

METHOD AND APPARATUS FOR PERFORMING ACQUISITION IN POWER SAVE MODE FOR WIRELESS COMMUNICATION SYSTEMS

RELATED APPLICATIONS

This application claims priority to U.S. Provisional Application No. 60/422,656 filed Oct. 30, 2002.

BACKGROUND

I. Field

The present invention relates generally to communication, and more specifically to techniques for performing acquisition by terminals operating in a power save mode.

II. Background

Wireless communication systems are widely deployed to provide various types of communication services such as voice, packet data, and so on. These systems may be multiple-access systems capable of supporting communication with multiple users by sharing the available system resources. Examples of such multiple-access systems include code division multiple access (CDMA) systems, time division multiple access (TDMA) systems, and frequency division multiple access (FDMA) systems. A CDMA system may be designed to implement one or more standards such as IS-2000, IS-856, IS-95, and W-CDMA. A cdma2000 system is a CDMA system that may implement IS-2000 and/or IS-856. A TDMA system may be designed to implement one or more standards such as Global System for Mobile Communications (GSM). A GSM system may implement General Packet Radio Service (GPRS) for packet data transmission. These various standards are well known in the art.

Some wireless communication systems (e.g., those that implement IS-2000, W-CDMA, and GSM/GPRS) are capable of supporting voice and packet data services. Each type of service is characterized by a particular set of requirements. For example, voice service typically requires a fixed and common grade of service (GOS) for all users and further imposes relatively stringent and fixed delays. In contrast, packet data service may be able to tolerate different GOS for different users and may further be able to tolerate variable amounts of delays. To support both types of service, a wireless communication system may first allocate system resources to voice users and then allocate any remaining system resources to packet data users who can tolerate longer delays.

Some wireless communication systems (e.g., those that implement IS-856) are optimized for packet data transmission, which is typically characterized by long periods of silence punctuated by large bursts of traffic. For an IS-856 system, a large portion of the system resources may be allocated to a single user, thereby greatly increasing the peak data rate for the user being served.

A service provider/network operator may deploy multiple wireless communication systems to provide enhanced services for its subscribers. For example, a service provider may deploy a voice/data system (e.g., an IS-2000 system) capable of providing both voice and packet data services for a large geographic area. This service provider may further deploy a packet data system (e.g., an IS-856 system) capable of providing packet data service for "hot spots", which are areas where packet data usage is expected to be high. The coverage areas of the two systems would typically overlap, and these systems would then be considered as "overlay" systems. A multimode/hybrid terminal may then be able to receive service from one or both of the systems depending on its location and the desired service.

If a terminal is mobile, then it may move into and out of the coverage areas of the individual systems as it roams about. One of the challenges when operating in such overlay systems is determining when to attempt acquisition of the packet data system when under the coverage of the voice/data system. Each unsuccessful acquisition attempt of the packet data system consumes battery power, which then reduces battery life and standby time. When idle, the terminal may be operated in a power save mode whereby power consumption is minimized to the extent possible so that standby time may be extended. In the power save mode, it is desirable to attempt acquisition on the packet data system in a manner such that battery power is conserved while maximizing the likelihood of acquisition.

There is therefore a need in the art for techniques to efficiently perform acquisition by a terminal in a wireless communication system.

SUMMARY

Techniques are provided herein to efficiently attempt acquisition on a wireless communication system (e.g., a packet data system, such as an IS-856 system). These techniques are especially efficient when the terminal has already acquired another wireless communication system (e.g., a voice/data system, such as an IS-2000 system).

In an aspect, information relating the voice/data system to the packet data system is used to more efficiently attempt acquisition of the packet data system. A terminal typically includes a preferred roaming list (PRL) that contains entries for channels in both the voice/data system and the packet data system. The PRL may be defined to include information indicating which channels in the packet data system are "co-located" with which channels in the voice/data system, as described below. If the terminal has acquired one or more channels in the voice/data system, then channels in the packet data system that are co-located with the acquired channels in the voice/data system may be determined from the PRL. Acquisition may then be attempted on a set of co-located channels in the packet data system. Knowledge of co-located channels may thus be advantageously used to limit the number of channels to attempt acquisition on.

In another aspect, multiple (e.g., "deep" and "shallow") acquisition modes are used to reduce power consumption for acquisition attempts. The deep acquisition mode may be designed so as to acquire a weak received signal with a low signal-to-noise ratio (SNR), and the shallow acquisition mode may be designed for a received signal with a larger frequency offset. Typically, acquisition involves searching with both the deep and shallow acquisition modes to make sure that the terminal can acquire the weakest possible signal while at the same time ensuring that acquisition success is not limited by frequency offset. However, when in power-save mode, the terminal may attempt acquisition using the deep and shallow acquisition modes in two phases. Ongoing acquisition attempts on a set of channels in the packet data system may be performed using one (deep or shallow) acquisition mode at a time to reduce power consumption.

In yet another aspect, acquisition is attempted on the set of channels in a "ping-pong" manner to improve the likelihood of acquisition. For a ping-pong search through a set of N+1 channels, {ch0, ch1, ch2, . . . chN}, an acquisition attempt is made on ch0 prior to an acquisition attempt on each of the remaining channels in the set. The ping-pong search may attempt acquisition on these N+1 channels in the following order: {ch0, ch1, ch0, ch2, . . . ch0, chN}. If ch0 is the most recently acquired channel, and hence the most likely to have signal transmission than other channels, then the ping-pong search can improve the likelihood of acquiring the packet data system.

In yet another aspect, acquisition is attempted on channels in the packet data system based on received signal strength estimates obtained for these channels. A "micro search" may be performed by the terminal to obtain a received signal strength estimate for a selected channel in the packet data system. The received signal strength estimate may then be used to determine whether or not to attempt acquisition on the selected channel. Micro searches may be performed in various manners, and the results of the micro searches may also be used in various ways, as described below.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 4A and 4B illustrate the power-save acquisition process with two and three co-located channels, respectively;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The acquisition techniques described herein may be used by terminals operating in stand-alone wireless communication systems as well as by terminals operating in overlay wireless communication systems. These techniques may be used for various communication systems, such as IS-2000, IS-856, IS-95, W-CDMA, GSM, and GSM/GPRS systems. For clarity, these techniques are described below for overlay communication systems comprised of a voice/data system and a packet data system.

Figure 1:
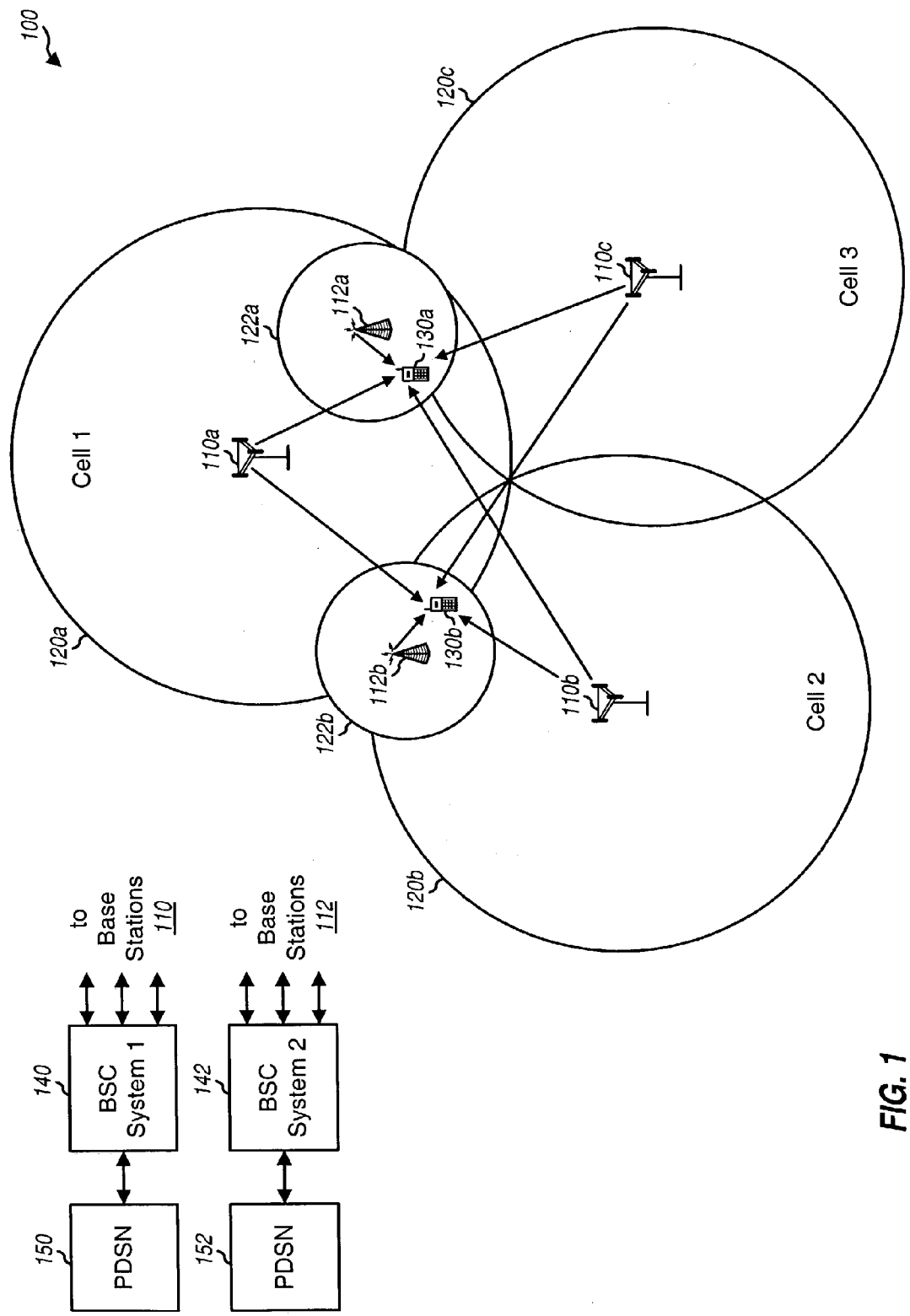
FIG. 1 shows a deployment whereby a packet data system overlays a voice/data system.

FIG. 1 shows a diagram of an exemplary deployment 100 whereby a packet data system overlays a voice/data system. The voice/data system may be deployed to provide voice and packet data services for a large geographic area. The packet data system may be deployed to provide packet data service for "hot spots", which are areas where packet data usage is expected to be high. The voice/data system may be an IS-2000 system (which is commonly referred to as a "1x" system), a W-CDMA system, a GSM/GPRS system, or some other system. The packet data system may be an IS-856 system (which is commonly referred to as a "1xEV-DO" system or an "HDR" system) or some other system.

The voice/data system includes a number of base stations 110 that can provide voice and packet data services for terminals located within coverage areas 120 of these base stations. Similarly, the packet data system includes a number of base stations 112 that can provide packet data service for terminals located within coverage areas 122 of these base stations. For simplicity, only few base stations 110 and 112 and terminals 130 are shown in FIG. 1. Base stations 110 and 112 may be located at different sites (as shown in FIG. 1) or co-located at the same sites. As also shown in FIG. 1, the coverage area of the packet data system may not be contiguous and may be isolated islands within and/or overlapping the coverage area of the voice/data system.

Base stations 110 couple to a base station controller (BSC) 140 that provides coordination and control for these base stations. Similarly, base stations 112 couple to a BSC 142 that provides coordination and control for these base stations. BSC 140 may further couple to a packet data serving node (PDSN) 150 that supports packet data service for the voice/data system, and BSC 142 may further couple to a PDSN 152 that supports packet data service for the packet data system.

In general, a base station is a fixed station for communicating with the terminals. A base station may also be referred to as a base transceiver system, an access point, a Node B, or some other terminology. A terminal communicates with the fixed stations and may also be referred to as a mobile station, a remote station, a wireless communication device, a user equipment (UE), or some other terminology. A terminal may be fixed or mobile.

A mobile terminal may move throughout the coverage areas of the voice/data system and the packet data system. For improved performance, it is desirable for the terminal to acquire and register with the packet data system whenever it is under the coverage of this system. The acquisition and registration process may be time consuming. By acquiring and registering with the packet data system when idle, the terminal will be able to send and/or receive data much more quickly when initiated by the user, which will enhance user experience and improve performance.

Due to the mobile nature of the terminal and the spotty coverage of the packet data system, there is no simple way to determine whether or not the terminal is under the coverage of the packet data system unless it attempts to acquire the system. However, frequent acquisition attempts can drain battery power and shorten standby time. The acquisition techniques described herein may be used by the terminal to efficiently attempt acquisition on the packet data system. These techniques are especially efficient when the terminal is under the coverage of the voice/data system.

Figure 2:
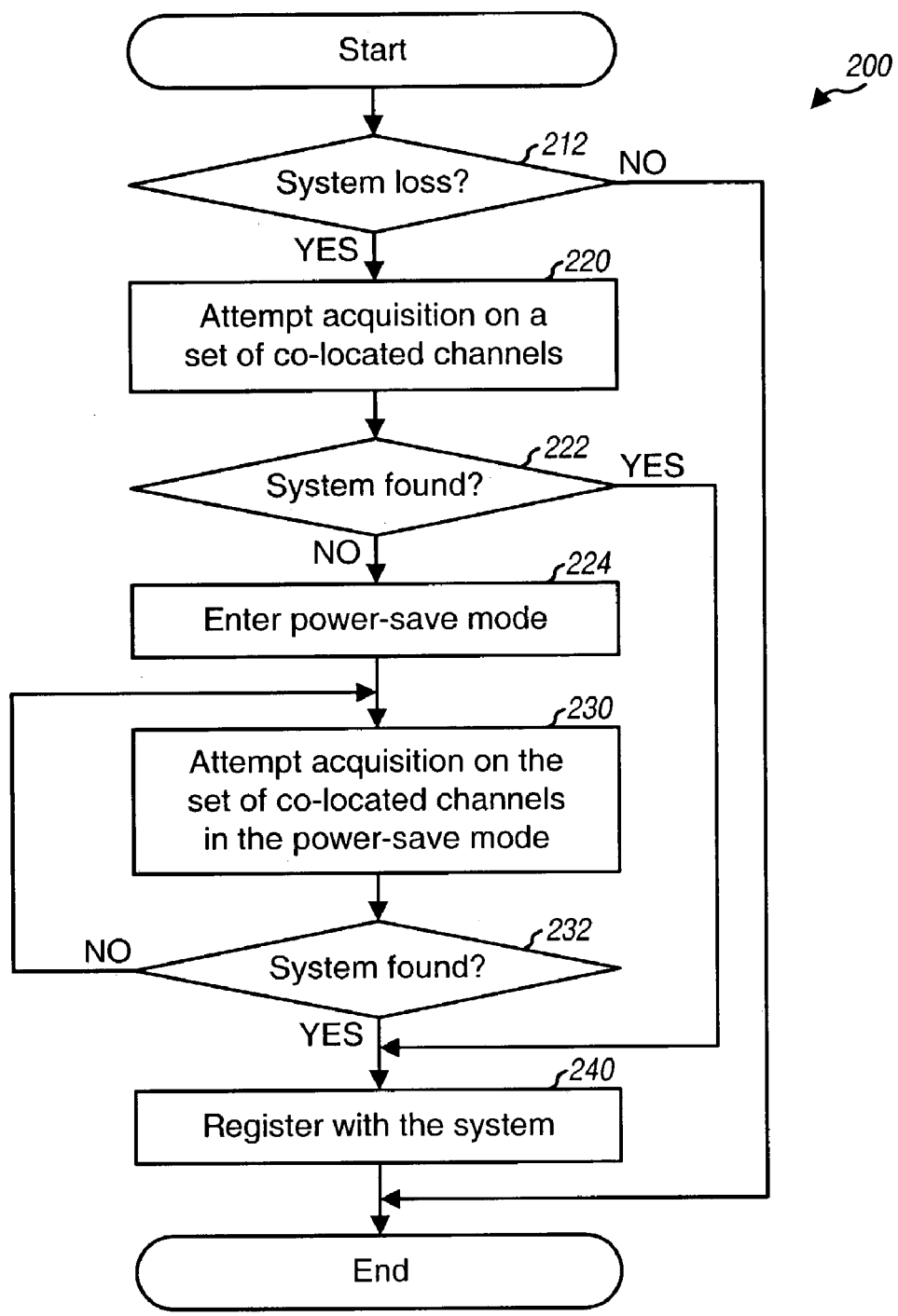
FIG. 2 shows a flow diagram of an overall acquisition process.

FIG. 2 shows a flow diagram of an embodiment of an overall acquisition process 200 that may be performed by a terminal to acquire the packet data system.

Initially, a determination is made whether the terminal has lost the packet data system (step 212). If the answer is 'no', then the acquisition process terminates. Otherwise, the terminal attempts acquisition on a set of "co-located" channels in the packet data system (step 220). As used herein, an "acquisition attempt" on a particular channel is a search for a signal on that channel through a designated search space. This search space may comprise, for example, a range of PN phases, a range of timing offsets, a range of frequency offsets, and so on, or any combination thereof. The search space may be dependent on (1) the designs of the packet data system and/or the terminal, (2) the manner in which the packet data system is operated, and (3) possibly other factors. The set of co-located channels may be determined as described below. If the packet data system is found on one of the co-located channels (as determined in step 222), then the terminal may perform a registration process with the packet data system via this co-located channel (step 240) to inform the packet data system of the terminal's presence. Otherwise, the terminal enters a power-save mode (step 224).

The terminal thereafter attempts acquisition on the set of co-located channels in the power-save mode (step 230). Acquisition in the power-save mode is described in further detail below. After each acquisition attempt on a particular co-located channel, a determination is made whether or not the packet data system was found on this channel (step 232). If the answer is 'yes', then the terminal acquires the packet data system and may perform registration with the system via this channel (step 240). The acquisition process then terminates. Otherwise, if the packet data system was not found, then the process returns to step 230 and the terminal continues to attempt acquisition on the set of co-located channels. Steps 220 and 240 are described in further detail below.

In an aspect, information relating the voice/data system to the packet data system is used to more efficiently search for the packet data system. For CDMA, a terminal typically stores a preferred roaming list (PRL) that includes a list of frequency bands and channels that the terminal may acquire. If the packet data system overlays the voice/data system, then each channel in the packet data system may be associated or "co-located" with a channel in the voice/data system. A channel x in the packet data system is considered to be co-located with a channel y in the voice/data system if a terminal that can receive a signal on channel y is also likely able to receive a signal on channel x. If the coverage area for channel y overlaps the coverage area for channel x, then the PRL may be defined to indicate that channel x is co-located with channel y. This may be achieved by marking or indicating channel x as being co-located with channel y in the PRL.

The PRL may be defined to include entries or records for channels in both the voice/data system and the packet data system. An entry for a channel in the voice/data system may include: Channel, Frequency Band, System Identification (SID), Network Identification (NID), Co-location Tag, Preference, and Geographical Location Indicator. An entry for a channel in the packet data system may include: Channel, Frequency Band, Subnet ID, Co-location Tag, Preference, and Geographical Location Indicator. The entry for each channel includes sufficient information needed to acquire that channel. The PRL may further include information relating channels in the voice/data system to channels in the packet data system. This information may be provided by the service provider/network operator. The information that a channel in the voice/data system has a co-located channel in the packet data system is useful for acquisition of the packet data system. The PRL and its contents are described in further detail in TIA/EIA-683-B Annex C, which is incorporated herein by reference.

If the terminal is under the coverage of the voice/data system and has acquired one or more channels in this system, then the PRL may be used to obtain channels in the packet data system that are co-located with the one or more acquired channels in the voice/data system. More specifically, if a particular channel in the voice/data system is acquired, then the terminal can look in the PRL to determine if there is a co-located channel in the packet data system. If a co-located channel exists, then the terminal can thereafter attempt to acquire this co-located channel. Conversely, if no co-located channels exist, then the terminal may save battery power by not searching for signals from the packet data system. Knowledge of co-located channels may thus be advantageously used when the coverage area of the packet data system overlays the coverage area of the voice/data system.

The terminal may attempt acquisition on a list of zero or more channels in the packet data system. This list may be intelligently determined based on the acquired voice/data system and the PRL. This list may include, for example, the channels in the packet data system listed in the PRL as being co-located with the acquired channels in the voice/data system, the N most recently acquired channels in the packet data system, and so on. The use of a list of co-located channels can provide improved performance, and is described in further detail below. This list of co-located channels is determined based on the channel currently acquired by the terminal for the voice/data system.

The terminal may be designed to enter a packet data-only mode of operation (i.e., with only the packet data system) if a signal from the voice/data system is not found. Alternatively, the terminal may also be designed to attempt acquisition of the packet data system only if the voice/data system is found (i.e., the terminal does not search for a signal from the packet data system if a signal from the voice/data system is not found).

The list of co-located channels in the packet data system on which to attempt acquisition may be represented by a set S={ch0, ch1, . . . chN}. For improved acquisition performance, the co-located channels may be sorted in an order determined by the amount of elapsed time since these channels were last acquired. The sorted set S would then include ch0 as the channel most recently acquired among the channels in set S, and hence the most likely to be acquired, by the terminal for the packet data system, and chN as the oldest channel acquired by the terminal or one that has never been acquired. The terminal may attempt acquisition on the co-located channels in the set in various manners, as described below.

In another aspect, multiple acquisition modes are used to reduce power consumption for acquisition attempts and to improve standby time. Table 1 lists three acquisition modes that may be used by the terminal to search for signals from the packet data system. Fewer, additional, and/or different acquisition modes may also be used, and this is within the scope of the invention.

TABLE 1

| Acquisition Mode | Description |
|---|---|
| Deep (D) | Demodulation parameters are selected to provide improved noise immunity so that signals with low signal-to-noise ratios (SNRs) may be acquired. |
| Shallow (S) | Demodulation parameters are selected such that signals with larger frequency offsets may be acquired. |
| Full (F) | A combination of deep and shallow. A full search is a deep search followed by a shallow search. |

To search for a signal on a particular channel in the packet data system, the terminal typically detects for a pilot included in the signal. To detect for the pilot, the signal received for that channel is conditioned and digitized to obtain complex-value data samples, which are further processed in a manner complementary to that performed at a base station. For CDMA, the data samples are first multiplied with a locally generated pseudo-random number (PN) sequence to obtain despread samples. The despread samples for each time interval of Nc chips are coherently accumulated to obtain a complex-value pilot symbol estimate for that time interval. The squared magnitude of each pilot symbol estimate is then obtained, and Nnc magnitude-squared pilot symbol estimates are non-coherently accumulated to provide a pilot energy estimate. The pilot energy estimate is also referred to as a received pilot power estimate or a received signal strength estimate.

Two parameters that affect the performance of the search for signals from the packet data system are the coherent integration interval (Nc) and the non-coherent integration interval (Nnc). A longer coherent integration interval (i.e., a larger value for Nc) corresponds to more averaging, provides greater noise immunity, and allows for detection of a signal with a low SNR. Conversely, a shorter coherent integration interval corresponds to less averaging, has reduced sensitivity, but provides higher probability of detection for a larger frequency error. Various values may be used for Nc and Nnc for each acquisition mode, and this is within the scope of the invention. As an example, the coherent and non-coherent integration intervals for an IS-856 system may be selected as: Nc=96 and Nnc=2 for the deep acquisition mode, and Nc=64 and Nnc=2 for the shallow acquisition mode. The particular values to use for Nc and Nnc may also be dependent on the pilot structure used by the packet data system.

Since the timing of a signal received from the packet data system is not known, the terminal typically searches for the pilot at various time offsets (or PN phases) of the locally generated PN sequence. For each hypothesis, which corresponds to a specific PN phase, the data samples are correlated with the locally generated PN sequence at that PN phase. The correlation is performed using the selected values for Nc and Nnc to obtain a received signal strength estimate for that hypothesis. Due to the pseudo-random nature of the PN sequence, the correlation of the data samples with the locally generated PN sequence should be low, except when the phase of the locally generated PN sequence is approximately aligned with the phase of the PN sequence in the received signal, in which case the correlation results in a high value.

The total time required to search for a signal on a particular channel is dependent on various factors, such as the coherent and non-coherent integration intervals, the number of hypotheses to evaluate, and so on. In one exemplary design, the total time required to search for one channel is approximately 820 msec using the deep acquisition mode (with Nc=96 and Nnc=2), approximately 660 msec using the shallow acquisition mode (with Nc=64 and Nnc=2), and approximately 1800 msec using the full acquisition mode. A full search thus requires a longer time to perform than a deep or shallow search.

To reduce power consumption and increase standby time, on-going acquisition searches for signals from the packet data system may be performed using one (i.e., deep or shallow) acquisition mode at a time. Conventionally, each search is performed using all possible sets of values for Nc and Nnc. A long period of time is then required for each search, which consumes battery power and shortens standby time. By performing searches for one acquisition mode at a time, a shorter period of time is required for each search without greatly impacting performance.

Upon detecting system loss (step 212 in FIG. 2), the terminal can attempt acquisition on the set of co-located channels in the packet data system (step 220). For each co-located channel, the terminal may perform a search using the deep, shallow, or full acquisition mode. The terminal may cycle through the set of co-located channels one or more times before declaring that the packet data system was not found (step 222) and entering the power-save mode (step 224).

Figure 3:
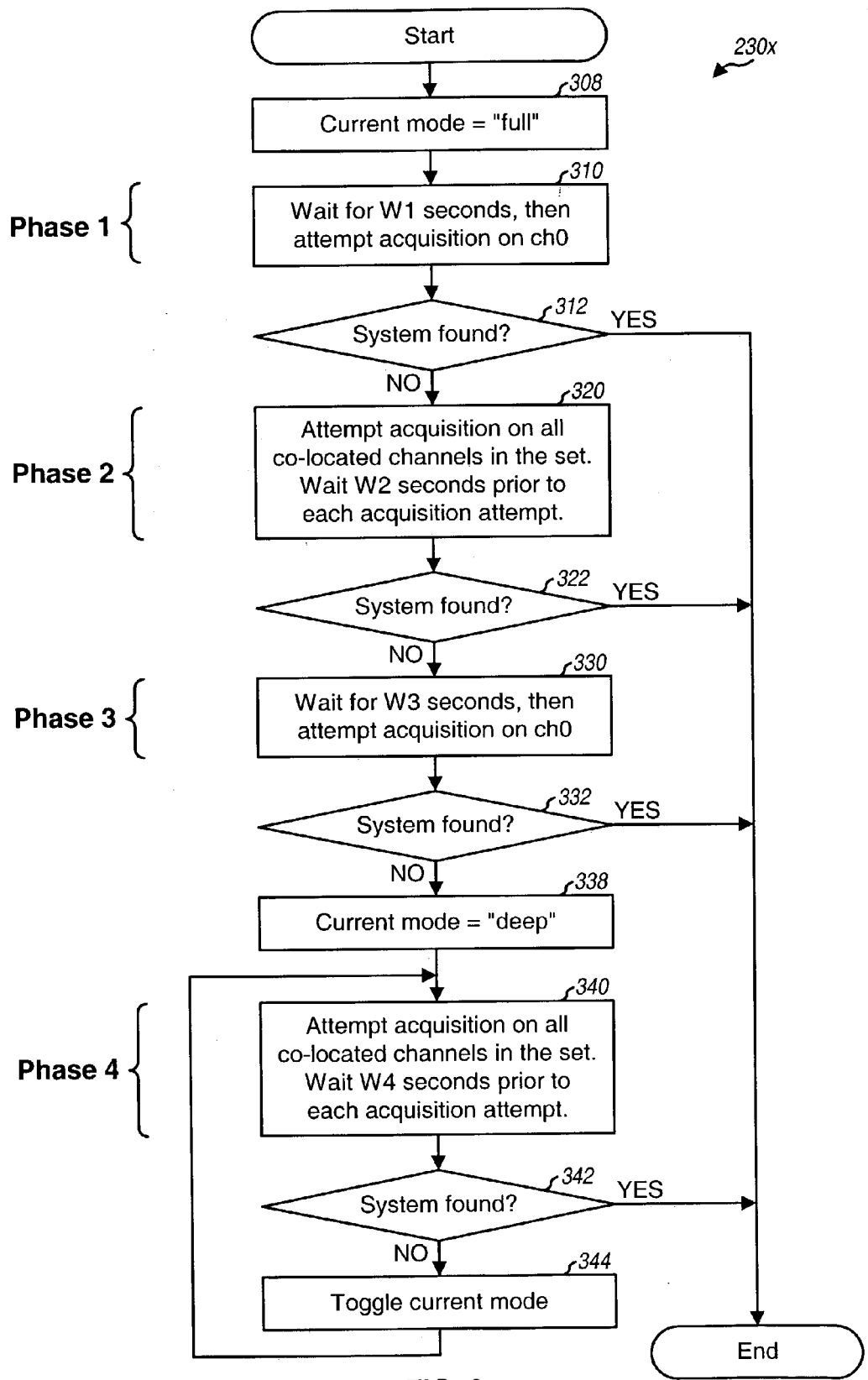
FIG. 3 shows a flow diagram of a power-save acquisition process.

FIG. 3 shows a flow diagram of an embodiment of a power-save acquisition process 230x that may be performed by the terminal to acquire the packet data system in the power-save mode. Process 230x may be used for step 230 in FIG. 2. In this embodiment, process 230x includes four phases, which are labeled as phases 1, 2, 3, and 4. In the following description, the parameters W1, W2, W3, and W4 denote the amount of time to wait prior to the next acquisition attempt in phases 1, 2, 3, and 4, respectively. Exemplary values for these parameters are given below. In general, W1<W2<W3<W4, where W1 is the shortest wait time and W4 is the longest wait time.

Initially, the current mode is set to the full acquisition mode (step 308). For phase 1, the terminal waits W1 seconds and then attempts acquisition on ch0, which is the most recently acquired channel in the packet data system (step 310). The acquisition search is performed using the full acquisition mode. If the packet data system is found on this channel (as determined in step 312), then the process terminates.

Otherwise, if the answer is 'no' for step 312, then the terminal enters phase 2 and attempts acquisition on all co-located channels in the set (step 320). The terminal waits W2 seconds prior to each acquisition attempt in step 320. For improved performance, the terminal may attempt acquisition on the co-located channels in a "ping-pong" manner, as described below. The acquisition searches are performed using the full acquisition mode. If the packet data system is found on any of the co-located channels (as determined in step 322), then the process terminates.

Otherwise, if the answer is 'no' for step 322, then the terminal enters phase 3, waits for W3 seconds, and then attempts acquisition on ch0 using the full acquisition mode (step 330). If the packet data system is found on this channel (as determined in step 332), then the process terminates.

Otherwise, if the answer is 'no' for step 332, then the terminal enters phase 4 and performs on-going acquisition searches on all co-located channels using one acquisition mode at a time (i.e., deep or shallow). This is achieved by first setting the current mode to a particular (e.g., deep) acquisition mode (step 338). The terminal then attempts acquisition on all co-located channels using the current mode (step 340). The terminal waits W4 seconds prior to each acquisition attempt in step 340. Again, for improved performance, the terminal may attempt acquisition on the co-located channels in a ping-pong manner. If the packet data system is found on any of the co-located channels (as determined in step 342), then the process terminates. Otherwise, the current mode is toggled (from deep to shallow, and from shallow to deep) (step 344). The process then returns to step 340, and the terminal attempts acquisition on all co-located channels using the new acquisition mode indicated by the updated current mode.

In yet another aspect, acquisition may be attempted on the co-located channels in a ping-pong manner to improve the likelihood of acquisition. For a ping-pong search through the set of co-located channels, an acquisition attempt is made on ch0 prior to an acquisition attempt on each of the other co-located channels in the set. For a set containing N+1 co-located channels {ch0, ch1, ch2, . . . chN}, a ping-pong search may attempt acquisition on these channels in the following order: {ch0, ch1, ch0, ch2, . . . ch0, chN}. Thus, if the set includes N+1 co-located channels, then N acquisition attempts are made on ch0 and one acquisition attempt is made on each of the other N co-located channels, ch1 through chN. Since ch0 is the most recently acquired channel in the packet data system, the likelihood of acquiring the packet data system via ch0 may be much greater than any of the other co-located channels. The ping-pong search can thus improve the likelihood of acquiring the packet data system.

A specific implementation of the system-loss acquisition process (step 220 in FIG. 2) and the power-save acquisition process (process 230*x* in FIG. 3) is described below. This implementation uses the ping-pong search for phases 2 and 4 of the power-save acquisition process.

System-Loss Acquisition

System-loss acquisition is performed after the terminal declares system loss.
1. Attempt acquisition on all co-located channels
2. Enter power-save mode Power-Save Acquisition Power-save acquisition is performed after failure to acquire the packet data system using system-loss acquisition.
   Phase 1
1. Wait W1 seconds
2. Attempt acquisition on ch0
   Phase 2
3. Wait W2 seconds
4. Attempt acquisition on ch0
5. Wait W2 seconds
6. chx=next co-located channel in the set other than ch0
7. Attempt acquisition on chx
8. Go to step 3. Repeat until acquisition has been attempted on all co-located channels in the set.
   Phase 3
9. Wait W3 seconds
10. Attempt acquisition on ch0
11. Wait W3 seconds
12. Set current mode="deep"
    Phase 4
13. Attempt acquisition on ch0 with current mode
14. Wait W4 seconds
15. chx=next co-located channel in the set other than ch0
16. Attempt acquisition on chx with current mode
17. Wait W4 seconds
18. Go to step 13. Repeat until acquisition has been attempted on all co-located channels in the set.
19. Toggle current mode between "deep" and "shallow".
20. Go to step 13. Repeat until system is found.

In general, the power-save acquisition process may include any number of phases. Furthermore, acquisition may be attempted on any number of channels in the packet data system for each phase. The flow diagram shown in FIG. 3 and the implementation described above represent specific embodiments of the power-save acquisition process.

For the implementation described above, acquisition is attempted on all co-located channels in a ping-pong manner for phases 2 and 4. Acquisition may also be attempted on the co-located channels in other manners, and this is within the scope of the invention. For example, acquisition may be attempted once on each co-located channel. As another example, acquisition may be attempted once or multiple times on each co-located channel depending on, for example, the likelihood of acquiring the channel, the amount of elapsed time since the channel was last acquired, and so on.

FIG. 4A illustrates the power-save acquisition process with two co-located channels {ch0, ch1}. For simplicity, the events in FIG. 4A are not drawn to scale on the horizontal time line. Shortly after system loss is declared for the packet data system, the terminal attempts acquisition on the two co-located channels ch0 and ch1 using the full acquisition mode ("F"). At the completion of these acquisition attempts, the packet data system was not acquired and the terminal enters the power-save mode.

For phase 1 of the power-save acquisition process, the terminal waits W4 seconds and then attempts acquisition on ch0. For phase 2, the terminal waits W2 seconds prior to attempting acquisition on each of the two co-located channels, ch0 and ch1. For phase 3, the terminal waits W3 seconds, then attempts acquisition on ch0, then waits another W3 seconds. The full acquisition mode is used for phases 1 through 3.

For phase 4, the terminal attempts acquisition on ch0, then waits W4 seconds, then attempts acquisition on ch1, then waits W4 seconds. This represents one complete cycle through the two co-located channels in the set. The terminal then cycles through the two co-located channels in similar manner. As indicated in FIG. 4A, the deep acquisition mode ("D") is used for the first cycle, the shallow acquisition mode ("S") is used for the second cycle, the deep acquisition mode is used again for the third cycle, and so on.

FIG. 4B illustrates the power-save acquisition process with three co-located channels {ch0, ch1, ch2} and ping-pong search. Shortly after declaring system loss, the terminal attempts acquisition on the three co-located channels, ch0, ch1, and ch2, using the full acquisition mode. The terminal enters the power-save mode at the completion of these acquisition attempts when the packet data system was not acquired.

For phase 1 of the power-save acquisition process, the terminal waits W1 seconds and then attempts acquisition on ch0. For phase 2, the terminal waits W2 seconds, then attempts acquisition on ch0, then waits W2 seconds, then attempts acquisition on ch1, then waits W2 seconds, then attempts acquisition on ch0, then waits W2 seconds, then attempts acquisition on ch2. This represents one complete cycle through the three co-located channels. For this cycle, the terminal attempts acquisition twice on ch0 and once on each of the other two co-located channels, ch1 and ch2. For phase 3, the terminal waits W3 seconds, then attempts acquisition on ch0, then waits another W3 seconds. Again, the full acquisition mode is used for phases 1 through 3.

For phase 4, the terminal cycles through the three co-located channels in a manner similar to that described above for phase 2. The deep acquisition mode is used for the first cycle (as indicated in FIG. 4B), the shallow acquisition mode is used for the second cycle (not shown in FIG. 4B), and so on.

The four phases for the power-save acquisition process are used to cover different operating scenarios. For phase 1, acquisition is attempted on the most recently acquired channel, ch0, W1 seconds after system loss is declared. Phase 1 is useful for an occasional loss of system due to fade. For phase 2, acquisition is attempted on all co-located channels with W2 seconds of wait time between acquisition attempts. Phase 2 is useful for two scenarios. The first scenario is a temporary loss of coverage, such as when the terminal is blocked from receiving signal for a couple of seconds. The second scenario is when the terminal moves from one frequency coverage to another. In this case, the terminal will search all co-located channels in phase 2 and will find the new channel to which it has moved to, without too much delay. The search through all co-located channels provides a high degree of confidence that coverage is indeed lost before proceeding to the next phase. For phase 3, acquisition is attempted on the most recently acquired channel, ch0, after a longer wait of W3 seconds. Phase 3 is useful for longer loss of coverage (e.g., driving through a tunnel) and has been shown to provide improved acquisition performance in many cases. By the time the terminal enters phase 4, there is a high degree of confidence that the terminal has no packet data system coverage. Hence, in order to save power, in phase 4, acquisition is periodically attempted with larger wait time on the co-located channels in an on-going process to acquire the packet data system.

The values for the parameters W1, W2, W3, and W4, which are used for phases 1, 2, 3, and 4, respectively, are selected to provide good acquisition performance as well as long standby time. The specific values to use are dependent on various factors such as the desired results, the operating environment, the terminal design, and so on. For example, one set of values may be used to achieve long standby time, a second set of values may be used to achieve faster acquisition time, a third set of values may be used to achieve a compromise between long standby time and fast acquisition time, and so on. The values for W1, W2, W3, and W4 may be fixed and stored within the terminal. Alternatively, these values may be configured, for example, via over-the-air signaling.

Table 2 lists exemplary values for the parameters W1, W2, W3, and W4. Other values may also be used, and this is within the scope of the invention.

TABLE 2

| Parameter | Value |
|---|---|
| W1 | 2 seconds |
| W2 | 6 seconds |
| W3 | 30 seconds |
| W4 | 420 seconds |

Once the terminal acquires the packet data system but is idle, it may enter a sleep mode whereby most of the circuitry is powered down to conserve battery power. In the sleep mode, the terminal periodically wakes up to check for pages and messages sent on an overhead channel. The awake time is determined by the total time required to warm up and tune the RF circuitry, search for the overhead channel, and process and decode the overhead channel. The sleep cycle duration (i.e., the time duration between consecutive awake periods) may be fixed or configured for the terminal to provide the desired sleep performance.

The value for W4 may be selected to achieve standby time performance that is comparable to sleep performance. If the awake time is 80 msec and the sleep cycle duration is 40 seconds in the sleep mode, then the awake percentage is 0.080/40=0.2%. If each acquisition attempt on a channel in the packet data system takes approximately 800 msec, then to achieve the same 0.2% awake percentage the value for W4 may be selected to be approximately 0.80/0.002=400 seconds.

Conventionally, the wait times for different phases of the acquisition process are typically much less than 400 seconds. For example, wait times of 10, 60, and 180 seconds may be used for phases 1, 2, and 3, respectively, of a 3-phase acquisition process. For each phase, acquisition is normally attempted multiple times on all channels in the system. Furthermore, a full search (e.g., both deep and shallow searches) is typically performed for each channel. This combination of short wait time, searching through all channels, and full search for each channel can result in significantly shorter standby time, which is highly undesirable for mobile application. A long wait time may be used for W4 without greatly sacrificing performance because the terminal can obtain service from the voice/data system.

An acquisition attempt on a given channel can take a relatively long time (e.g., approximately 800 msec, for just the deep or shallow acquisition mode for an exemplary design). A received signal strength estimate may be obtained for a channel in a much shorter amount of time (e.g., approximately 30 to 40 msec, for an exemplary terminal design). This is because accurate timing and frequency need not be achieved to obtain a received signal strength estimate for a channel. A received signal strength estimate that is sufficiently high would indicate a high likelihood of a signal being present on the channel. However, a received signal strength estimate that is low may not accurately indicate the presence or absence of a signal on the channel. This is because a weak signal may still be acquired once timing and frequency lock have been achieved.

In yet another aspect, acquisition is attempted on the co-located channels based on received signal strength estimates obtained for these channels. A "micro search" may be performed by the terminal to obtain a received signal strength estimate for a channel. Micro searches may be performed and used in various manners in the power-save mode to improve standby time, as described below.

The result of a micro search for a given channel may be used to determine whether or not to attempt acquisition on that channel. A terminal in a CDMA system may be designed with the capability to recover a signal with received power ranging from −25 dBm to −105 dBm. The received signal strength estimate for the co-located channel may be compared against one or more thresholds, and acquisition may or may not be attempted based on the result of the comparison.

As an example, two thresholds of −65 dBm and −85 dBm may be used. If the received signal strength estimate exceeds −65 dBm, which indicates a high likelihood of a signal being present on the channel, then acquisition may be attempted on this channel using the full acquisition mode. If the received signal strength estimate is greater than −85 dBm but less than −65 dBm, which indicates a good likelihood of a signal being present on the channel, then acquisition may be attempted on this channel using the deep or shallow acquisition mode. As another example, a single threshold of −75 dBm may be used. If the received signal strength estimate is greater than −75 dBm, then acquisition may be attempted on the channel using the deep, shallow, or full acquisition mode. In general, if the received signal strength estimate is greater than a particular threshold, then acquisition may be attempted on this channel, without having to wait for the expiration of the wait time.

The micro searches may be performed in various manners. In one embodiment, micro searches are performed during the wait time between "scheduled" acquisition attempts. The normal search schedule has acquisition being attempted on the co-located channels every W4 seconds. These may be considered as scheduled acquisition attempts. One or more micro searches may be performed for one or more selected channels during the wait time W4 between consecutive scheduled acquisition attempts. For example, a micro search may be performed every Wm seconds (e.g., 30 seconds) during the wait time W4, and the co-located channels in the set may be cycled through. The results of these micro searches may be used to invoke additional acquisition attempts.

In another embodiment, a micro search is performed at the end of (or concurrent with) each scheduled acquisition attempt to obtain a received signal strength estimate for the next co-located channel to be searched or a randomly selected co-located channel. For example, a received signal strength estimate may be obtained for ch1 after the acquisition attempt on ch0 is completed.

Figure 5:
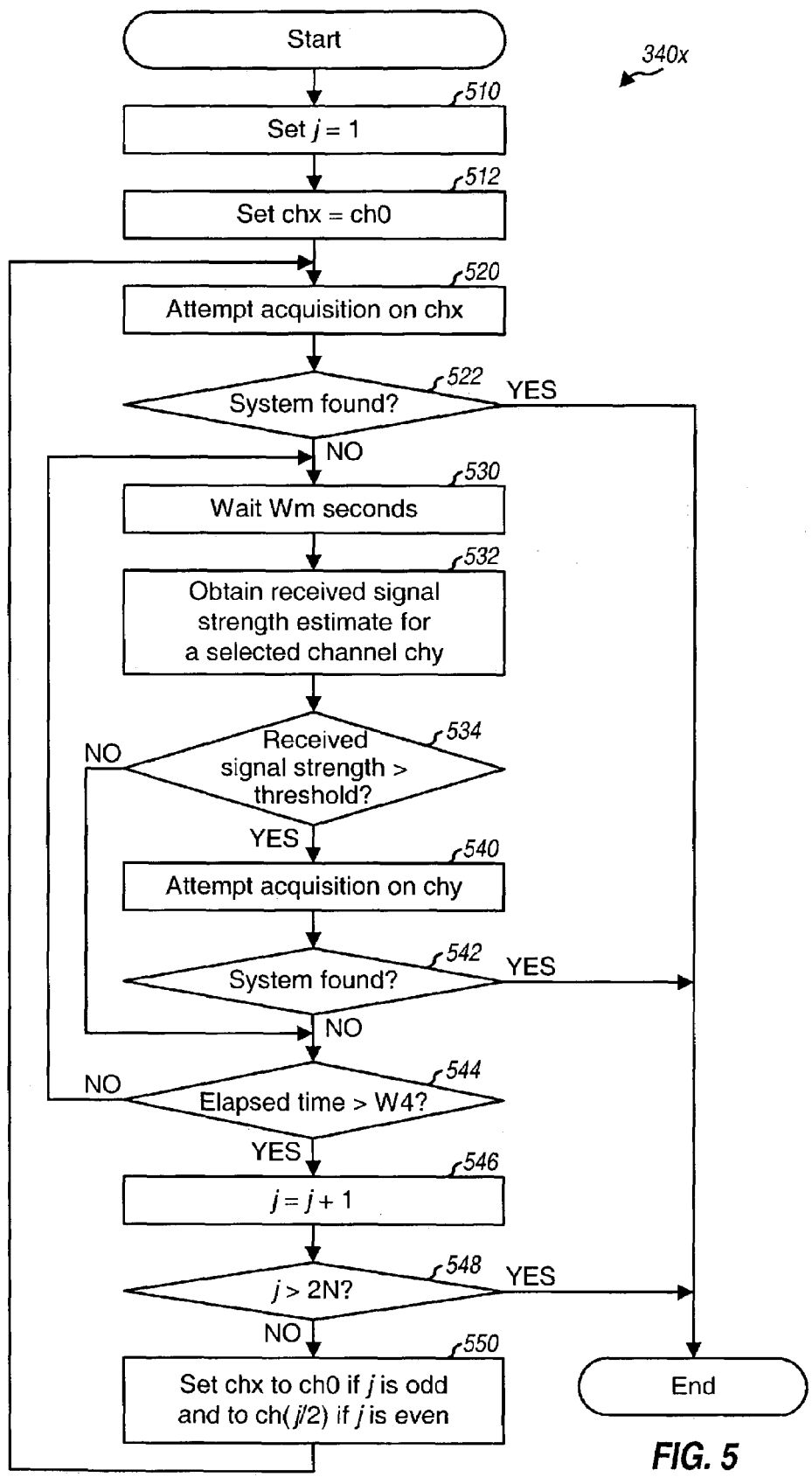
FIG. 5 shows a flow diagram for one cycle in phase 4 of the power-save acquisition process, with micro searches.

FIG. 5 shows a flow diagram of an embodiment of a process 340x that may be used for one cycle in phase 4 of the power-save acquisition process. Process 340x may be used for step 340 in FIG. 3. In this embodiment, process 340x performs a scheduled acquisition attempt on a co-located channel every W4 seconds using the current mode, which may be the deep or shallow acquisition mode. Process 340x further performs a micro search every Wm seconds between scheduled acquisition attempts, where Wm<W4.

At the start of the cycle, an index j is initialized to one (i.e., j=1) (step 510). This index is used to determine the next co-located channel to attempt acquisition on under the normal search schedule. A variable chx is then set to ch0 (step 512). The variable chx indicates the next co-located channel to attempt acquisition on under the normal search schedule.

The terminal then attempts acquisition on chx using the current mode (step 520). If the packet data system is found on this channel (as determined in step 522), then the process terminates. Otherwise, the terminal waits Wm seconds (step 530) and then performs a micro search for a selected channel, chy, to obtain a received signal strength estimate for this channel (step 532). The selected channel may be the next co-located channel to attempt acquisition on under the normal search schedule (which may be determined as shown in steps 546 and 550) or a randomly selected channel. Alternatively, the co-located channels in the set may be cycled through by the micro searches, starting with ch0 or ch1, and the selected channel may be the next co-located channel in the set to perform the micro search on.

The received signal strength estimate for the selected channel may be compared against one or more thresholds (step 534). The terminal may attempt acquisition on the selected channel if the received signal strength estimate exceeds the threshold(s) (step 540). Multiple thresholds may be used, for example, to determine which acquisition mode to use for the selected channel, as described above. If the packet data system is found on this selected channel (as determined in step 542), then the process terminates.

Otherwise, a determination is made whether or not the elapsed time is greater than W4 seconds (step 544). If the answer is 'no,' then the process returns to step 530 to perform the next micro search. Otherwise, if the elapsed time exceeds W4 seconds, then the index j is incremented (step 546). If the index j is greater than 2N (as determined in step 548), which indicates that acquisition has been attempted on all co-located channels in the set, then the process terminates. Otherwise, acquisition is attempted on the next co-located channel. For the ping-pong search, the variable chx is set to ch0 if the index j is odd and to ch(j/2) if the index j is even. The process then returns to step 520 to attempt acquisition on chx.

Figure 6:
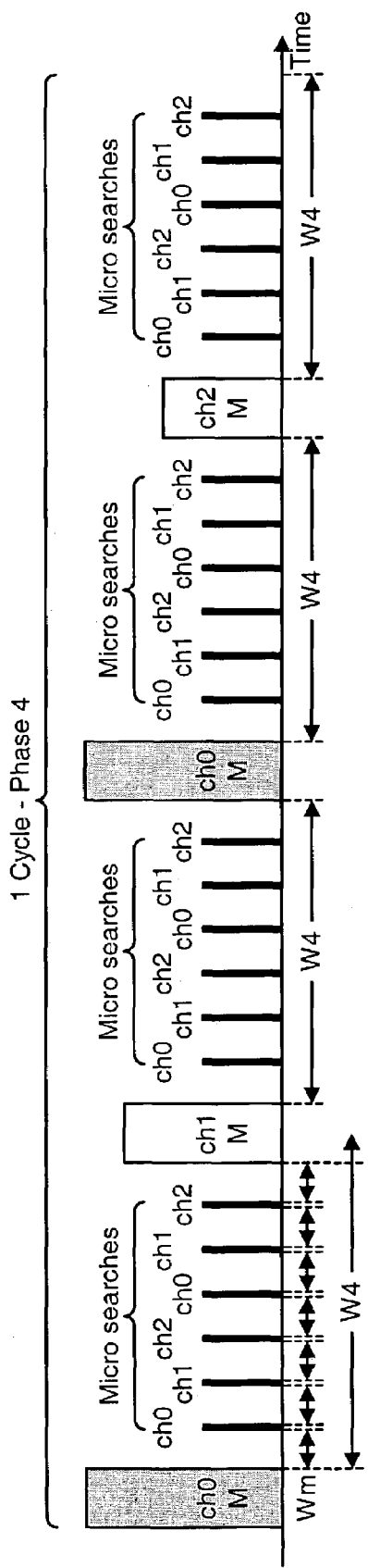
FIG. 6 illustrates one cycle in phase 4 of the power-save acquisition process, with micro searches.

FIG. 6 illustrates one cycle in phase 4 of the power-save acquisition process, with micro searches. For this embodiment, the set includes three co-located channels {ch0, ch1, ch2}, and micro searches are performed for all channels in the set.

For this cycle, the terminal first attempts acquisition on ch0 using the current mode M, where M is either deep or shallow. For each Wm seconds thereafter, the terminal performs a micro search for the next co-located channel in the set, starting with ch0 (as shown in FIG. 6) or a randomly selected channel. After W4 seconds, the terminal attempts acquisition on ch1. For each Wm seconds after the completion of the acquisition attempt on ch1, the terminal performs a micro search for the next co-located channel in the set, starting with ch0, a randomly selected channel, or the channel after the last one for which a micro search was performed. Thereafter, the acquisition attempts on ch0 and ch2 and the micro searches during the wait times between these acquisition attempts may be performed in similar manner, as shown in FIG. 6.

The acquisition techniques described herein may be used by a hybrid terminal operating in overlay communication systems (e.g., IS-2000 and IS-856 systems). In this case, information relating the channels in the two systems may be used to streamline the acquisition process, as described above. These acquisition techniques may also be used by a terminal operating in a stand-alone system (e.g., an IS-856 system). In this case, the set of channels on which to attempt acquisition may be determined in various manners. For example, the set may include the N most recently acquired channels, the N channels acquired within the last T seconds, the N channels most likely to be acquired, the N available channels, and so on, where N can be any integer zero or greater. The values for the parameters W1 through W4 may be selected to provide the desired performance for a terminal operating in the stand-alone system, which may be different from the values used for overlay systems. Micro searches may also be performed on the channels in the system to improve acquisition performance while minimizing impact to standby time.

Figure 7:
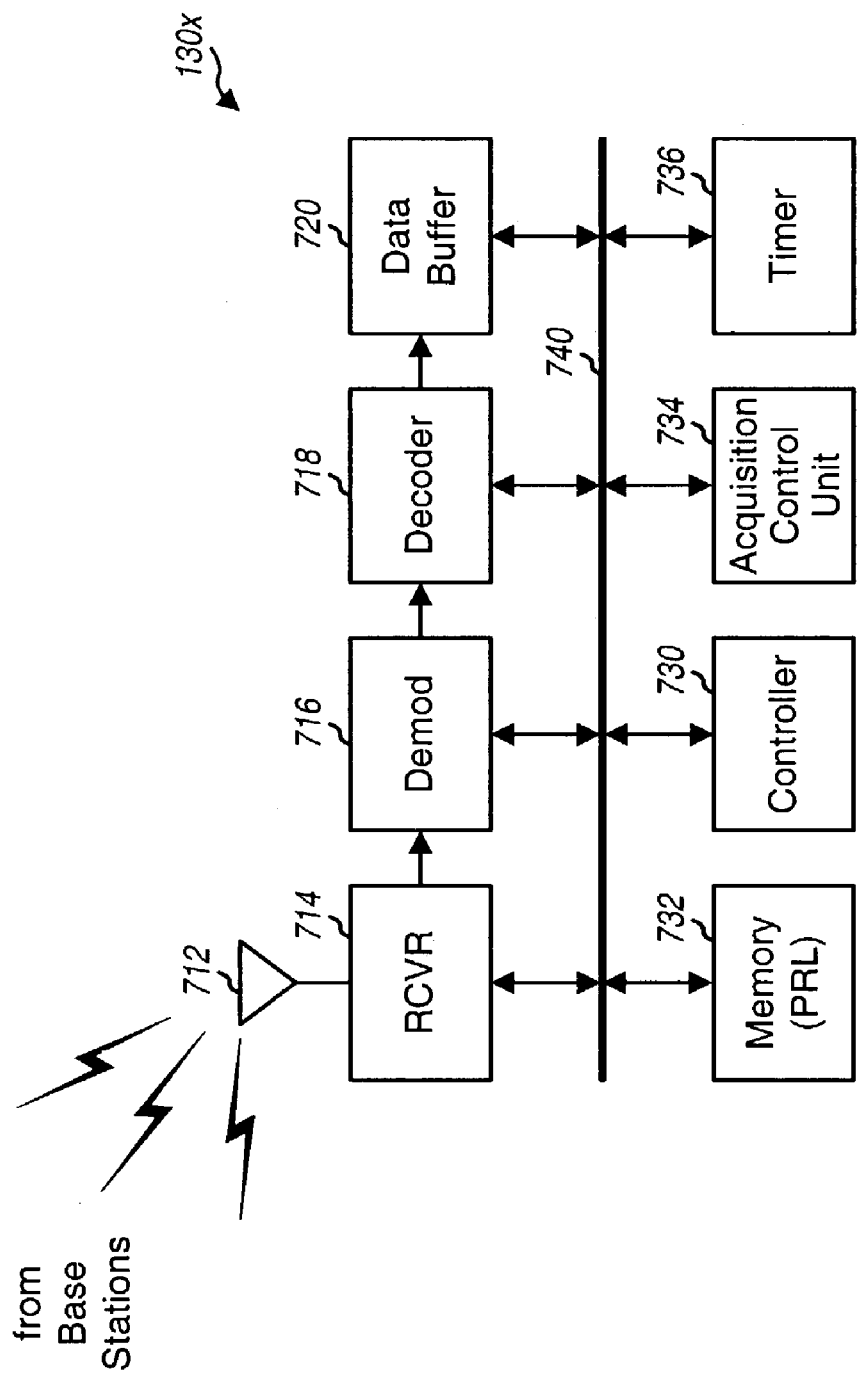
FIG. 7 shows a block diagram of a terminal.

FIG. 7 shows a block diagram of an embodiment of a terminal 130x capable of communicating with multiple wireless communication systems (e.g., IS-2000 and IS-856 systems). Terminal 130x may be any one of the terminals shown in FIG. 1, and may be a cellular phone, a handset, a wireless device, a modem, or some other device.

At terminal 130x, the forward link signals transmitted by the base stations in multiple systems are received by an antenna 712 and provided to a receiver unit (RCVR) 714. The received signal from antenna 712 typically includes one or more instances of the forward link signal transmitted by each of multiple base stations. Receiver unit 714 conditions (e.g., filters, amplifies, and frequency downconverts) the received signal and digitizes the conditioned signal to provide data samples. The frequencies used by receiver unit 714 for the frequency downconversion are typically dependent on the channel being processed or acquired by the terminal.

A demodulator (Demod) 716 then processes the data samples in accordance with the systems being received. Demodulator 716 may implement a rake receiver that is capable of processing multiple signal instances in the received signal to obtain pilot estimates and demodulated symbols for each of one or multiple base stations. For a CDMA system, the processing by demodulator 716 to obtain pilot estimates for a particular channel may include (1) despreading the data samples with a PN sequence assigned to the channel being recovered, (2) decovering the despread samples with a channelization code for the pilot channel (which is typically a sequence of all zeros) to obtain decovered pilot symbols, and (3) filtering the decovered pilot symbols to provide the pilot estimates. For a CDMA system, the processing by demodulator 716 to obtain demodulated symbols for a particular channel may include (1) despreading the data samples with the PN sequence assigned to the channel being recovered, (2) decovering the despread samples with a channelization code for each traffic channel being recovered, and (3) data demodulating the decovered symbols with the pilot estimates to obtain the demodulated symbols, which are estimates of the symbols transmitted on the channel by the base station. A decoder 718 further processes (e.g., deinterleaves and decodes) the demodulated symbols to provide decoded data, which may be stored in a data buffer 720.

Demodulator 716 and/or a controller 730 may further process the pilot estimates to obtain the received signal strength estimate for the channel, which may then be used to determine whether or not to attempt acquisition on that channel, as described above.

An acquisition control unit 734 controls acquisition by the terminal, initiates acquisition attempts on channels in the packet data system, and may implement the acquisition processes described above. Unit 734 may determine the list of co-located channels in the packet data system on which to attempt acquisition, based on the PRL stored in a memory unit 732 and the one or more channels acquired for the voice/data system, as described above. Unit 734 may then initiate acquisition attempts on the co-located channels based on (1) timing information provided by a timer 736, (2) received signal strength estimates and search results provided by demodulator 716, and (3) possibly other information.

Controller 730 may direct the operation of various processing units within terminal 130x. Memory unit 732 may store data and program codes used by various processing units within terminal 130x and may further store the PRL. A bus 740 may be used to provide the interface between various processing units within terminal 130x. Controller 730 may also implement acquisition control unit 734.

The acquisition techniques described herein may be implemented by various means. For example, these techniques may be implemented in hardware, software, or a combination thereof. For a hardware implementation, the elements used to implement the acquisition techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 732 in FIG. 7) and executed by a processor (e.g., controller 730). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claim is:

1. A wireless device comprising:
a control unit operative to obtain information for an acquired first wireless communication system implementing a first communication standard, determine one or more channels in a second wireless communication system implementing a second communication standard based on the information obtained for the first system implementing the first communication standard, and initiate acquisition attempts on the one or more channels in the second system, wherein the one or more channels in the second system are determined based on the information obtained for the first system to limit the number of channels to attempt acquisition for the second system; and
a demodulator operative to process a received signal in accordance with the first standard when receiving the first system and in accordance with the second standard when attempting acquisition on the one or more channels in the second system as indicated by the control unit.

2. The device of claim 1, farther comprising:
a memory unit operative to store a roaming list with entries for channels in the first system, entries for channels in the second system, and information indicating which channels in the second system are co-located with which channels in the first system.

3. The device of claim 1, wherein the information obtained for the first system indicates one or more channels in the first system which the device has acquired, and wherein the one or more channels in the second system are co-located with the one or more channels in the first system.

4. The device of claim 1, wherein the one or more channels in the second system are sorted in an order determined by amount of elapsed time since the one or more channels were last acquired by the device.

5. The device of claim 1, wherein the control unit is operative to forego initiating acquisition attempts if no channels in the second system are determined based on the information obtained for the first system.

6. The device of claim 1, wherein the control unit is operative to initiate acquisition attempts on the one or more channels using a plurality of phases, each phase being associated with a respective wait time, and wherein acquisition attempts are initiated on at least one of the one or more channels for each of the plurality of phases.

7. The device of claim 1, wherein the first system supports voice and packet data services and the second system supports packet data service.

8. The device of claim 1, wherein the first system is an IS-2000 system and the second system is an IS-856 system.

9. A wireless device comprising:
a control unit operative to obtain information for an acquired first wireless communication system, determine one or more channels in a second wireless communication system based on the information obtained for the first system, and initiate acquisition attempts on the one or more channels in the second system using a plurality of phases, each phase being associated with a respective wait time, wherein acquisition attempts are initiated on at least one of the one or more channels for each of the plurality of phases, and wherein the control unit is operative to wait for a wait time of more than 180 seconds prior to initiating an acquisition attempt in a last phase of the plurality of phases; and a demodulator operative to process the one or more channels as indicated by the control unit.

10. An apparatus comprising:

means for obtaining information for an acquired first wireless communication system implementing a first communication standard;

means for determining one or more channels in a second wireless communication system implementing a second communication standard based on the information obtained for the first system implementing the first communication standard and for limiting the number of channels to attempt acquisition for the second system based on the information obtained for the first system; and means for initiating acquisition attempts on the one or more channels in the second system.

11. The apparatus of claim 10, further comprising:

means for storing a roaming list with entries for channels in the first system, entries for channels in the second system, and information indicating which channels in the second system are co-located with which channels in the first system.

12. The apparatus of claim 10, wherein the information obtained for the first system indicates one or more acquired channels in the first system, and wherein the one or more channels in the second system are co-located with the one or more acquired channels in the first system.

13. The apparatus of claim 10, further comprising:

means for processing a received signal in accordance with the first standard when receiving the first system; and means for processing the received signal in accordance with the second standard when attempting acquisition on the one or more channels in the second system.

14. A method of acquisition, comprising:

obtaining information for an acquired first wireless communication system implementing a first communication standard;

determining one or more channels in a second wireless communication system implementing a second communication standard based on the information obtained for the first system implementing the first communication standard and limiting the number of channels to attempt acquisition for the second system based on the information obtained for the first system; and initiating acquisition attempts on the one or more channels in the second system.

15. The method of claim 14, wherein the information obtained for the first system indicates one or more acquired channels in the first system, and wherein the one or more channels in the second system are co-located with the one or more acquired channels in the first system.

16. The method of claim 14, further comprising:

processing a received signal in accordance with the first standard when receiving the first system; and processing the received signal in accordance with the second standard when attempting acquisition on the one or more channels in the second system.

17. A processor readable media for storing instructions operable in a wireless device to:

obtain information for an acquired first wireless communication system implementing a first communication standard;

determine one or more channels in a second wireless communication system implementing a second communication standard based on the information obtained for the first system implementing the first communication standard and limit the number of channels to attempt acquisition for the second system based on the information obtained for the first system; and initiate acquisition attempts on the one or more channels in the second system.

18. The processor readable media of claim 17, and further for storing instructions operable to:

initiate processing of a received signal in accordance with the first standard when receiving the first system; and initiate processing of the received signal in accordance with the second standard when attempting acquisition on the one or more channels in the second system.

19. The processor readable media of claim 17, and further for storing instructions operable to:

receive a roaming list with entries for channels in the first system, entries for channels in the second system, and information indicating which channels in the second system are co-located with which channels in the first system.

20. The processor readable media of claim 17, wherein the information obtained for the first system indicates one or more acquired channels in the first system, and wherein the one or more channels in the second system are co-located with the one or more acquired channels in the first system.

* * * * *